(12) United States Patent
Shikano et al.

(10) Patent No.: US 11,777,110 B2
(45) Date of Patent: Oct. 3, 2023

(54) FUEL CELL (71) Applicant: HONDA MOTOR CO., LTD., Tokyo (JP)

(72) Inventors: Takaaki Shikano, Wako (JP); Masaru Oda, Wako (JP); Yoshihito Kimura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/674,080

(22) Filed: Feb. 17, 2022

(65) Prior Publication Data

US 2022/0302470 A1    Sep. 22, 2022

(30) Foreign Application Priority Data

Mar. 22, 2021 (JP) .................................. 2021-047390

(51) Int. Cl.
| | | |
|---|---|---|
| *H01M 8/026* | (2016.01) | |
| *H01M 8/1004* | (2016.01) | |
| *H01M 8/0273* | (2016.01) | |
| *H01M 8/242* | (2016.01) | |

(52) U.S. Cl.
CPC ......... *H01M 8/026* (2013.01); *H01M 8/0273* (2013.01); *H01M 8/1004* (2013.01); *H01M 8/242* (2013.01)

(58) Field of Classification Search
CPC .. H01M 8/026; H01M 8/0273; H01M 8/1004; H01M 8/242; H01M 8/0204; H01M 8/0271; H01M 8/1006
See application file for complete search history.

(56) References Cited

U.S. PATENT DOCUMENTS

| | | | |
|---|---|---|---|
| 11,018,366 B2 | 5/2021 | Ishida et al. | |
| 2011/0070516 A1* | 3/2011 | Oda ..................... | H01M 8/241 |
| | | | 429/444 |
| 2015/0072265 A1 | 3/2015 | Ishida et al. | |
| | | (Continued) | |

FOREIGN PATENT DOCUMENTS

| | | |
|---|---|---|
| CN | 104170147 A | 11/2014 |
| JP | 2014-044957 A | 3/2014 |
| | (Continued) | |

OTHER PUBLICATIONS

Office Action dated Mar. 4, 2023 issued over the corresponding Chinese Patent Application 202210183649.6 with the English translation thereof.

*Primary Examiner* — Stewart A Fraser
(74) *Attorney, Agent, or Firm* — Carrier, Shende & Associates P.C.; Joseph P. Carrier; Jeffrey T. Gedeon (57) ABSTRACT

A fuel cell includes: an electrolyte membrane-electrode structure in which electrodes are provided on both surfaces of an electrolyte membrane and a frame member is joined to the outer peripheral portion of the electrolyte membrane; and a pair of separators for sandwiching the electrolyte membrane-electrode structure, wherein an overlapping portion of the outer peripheral portion of the electrode and the inner peripheral portion of the frame member is disposed in a flow field section in which flow field grooves for allowing a reactant gas to flow along the electrode surface of the electrolyte membrane-electrode structure are formed, and is disposed so as not to extend into buffers between the flow field section and passages.

7 Claims, 7 Drawing Sheets

(56) References Cited

U.S. PATENT DOCUMENTS

| | | | |
|---|---|---|---|
| 2019/0131633 A1* | 5/2019 | Ishida | H01M 8/026 |
| 2019/0198889 A1* | 6/2019 | Nishida | H01M 8/1004 |
| 2019/0198902 A1* | 6/2019 | Ishida | H01M 8/026 |
| 2019/0214655 A1* | 7/2019 | Nishida | H01M 8/04089 |
| 2019/0273268 A1 | 9/2019 | Ebato et al. | |
| 2020/0028188 A1 | 1/2020 | Sasaki et al. | |
| 2020/0388860 A1 | 12/2020 | Terada et al. | |

FOREIGN PATENT DOCUMENTS

| | | |
|---|---|---|
| JP | 2014-186858 A | 10/2014 |
| JP | 2018-085334 A | 5/2018 |
| JP | 2019-153585 A | 9/2019 |
| JP | 2020-013742 A | 1/2020 |
| JP | 2020-119885 A | 8/2020 |
| JP | 2020-198266 A | 12/2020 |

\* cited by examiner

FUEL CELL

CROSS-REFERENCE TO RELATED APPLICATIONS

This application is based upon and claims the benefit of priority from Japanese Patent Application No. 2021-047390 filed on Mar. 22, 2021, the contents of which are incorporated herein by reference.

BACKGROUND OF THE INVENTION

Field of the Invention

The present invention relates to a fuel cell comprising a membrane electrode assembly with a resin film.

Description of the Related Art

Generally, the solid polymer electrolyte fuel cell employs a solid polymer electrolyte membrane made of a polymer ion exchange membrane. A fuel cell includes a membrane electrode assembly (MEA). The MEA has an anode on one surface of the solid polymer electrolyte membrane and a cathode on the other surface of the solid polymer electrolyte membrane. In the fuel cell, the MEA is sandwiched between separators (bipolar plates). Such a fuel cell is also referred to as a unit fuel cell. The fuel cell is used, for example, in an in-vehicle fuel cell stack. The in-vehicle fuel cell stack is formed of a predetermined number of fuel cells stacked together.

In recent years, an MEA with a resin film in which a frame-shaped resin film (frame member) is incorporated in the outer periphery of a solid polymer electrolyte membrane has been adopted for the purpose of reducing the amount of use of a relatively expensive solid polymer electrolyte membrane and protecting the solid polymer electrolyte membrane in a shape of a thin film having low strength.

Such a fuel cell has a flow field section adjacent to a power generation area. The flow field section has a plurality of flow field grooves formed between a plurality of ridges protruding in the shape of lines from the separator. These flow field grooves serve as a reactant gas flow field for guiding a reactant gas in a predetermined direction. The reactant gas is supplied to the flow field grooves in the flow field section through a passage penetrating the separator. Further, the fuel cell has a buffer between the passage and the flow field section in order to uniformly supply the reactant gas to the flow field grooves. The buffer has bosses protruding from the separator (for example, JP 2020-013742 A).

SUMMARY OF THE INVENTION

In a conventional fuel cell, the frame member (frame-shaped resin film) is joined to the electrodes and the electrolyte membrane at the buffer outside the flow field section.

However, the buffer includes a branching portion and a merging portion connected to the reactant gas flow field. At the branching portion and the merging portion, the bosses of the separator supporting the resin frame are truncated. The truncated ends of the bosses create a relatively large gap, thereby forming the branching portion and the merging portion of flow paths. In the conventional fuel cell, the resin frame is joined to (overlapped with) the electrodes and the electrolyte membrane at a portion straddling the flow field section and the buffer. Therefore, in the conventional fuel cell, a relatively thick structure (for example, a diffusion layer of an electrode) compressed by the ridges of the flow field section bulges out toward the buffer where the bosses are relatively sparse. As a result, the relatively thick structure bulging out to the buffer sometimes fills a part of the flow paths in the buffer, thereby increasing the pressure loss of the reactant gas.

Therefore, a fuel cell capable of suppressing the pressure loss of the reactant gas is required.

An aspect of the disclosure is a fuel cell including: a membrane electrode assembly having a pair of electrodes provided on both sides of an electrolyte membrane and a frame member joined to an outer peripheral portion of the electrolyte membrane; a pair of separators for sandwiching the membrane electrode assembly; a flow field section including a plurality of ridges each projecting, in a shape of a line, from one of the separators toward a power generation area of the membrane electrode assembly, and a plurality of flow field grooves formed between the ridges to allow a reactant gas to flow along an electrode surface of one of the electrodes of the membrane electrode assembly; a passage penetrating the separators in a thickness direction for supplying or discharging the reactant gas; and a buffer provided between the passage and the flow field section for guiding the reactant gas between the passage and the flow field section, wherein an outer end of at least one of the electrodes is arranged in the flow field section, and an outer peripheral portion of the at least one of the electrodes overlaps an inner peripheral portion of the frame member at an overlapping portion positioned within the flow field section, without extending beyond a boundary between the buffer and the flow field section.

The fuel cell in the above aspect suppresses the pressure loss of the reactant gas and improves the power generation efficiency.

The above and other objects, features and advantages of the present invention will become more apparent from the following description when taken in conjunction with the accompanying drawings in which a preferred embodiment of the present invention is shown by way of illustrative example.

DESCRIPTION OF THE INVENTION

Hereinafter, a preferred embodiment of the fuel cell will be described in detail with reference to the accompanying drawings.

Figure 1:
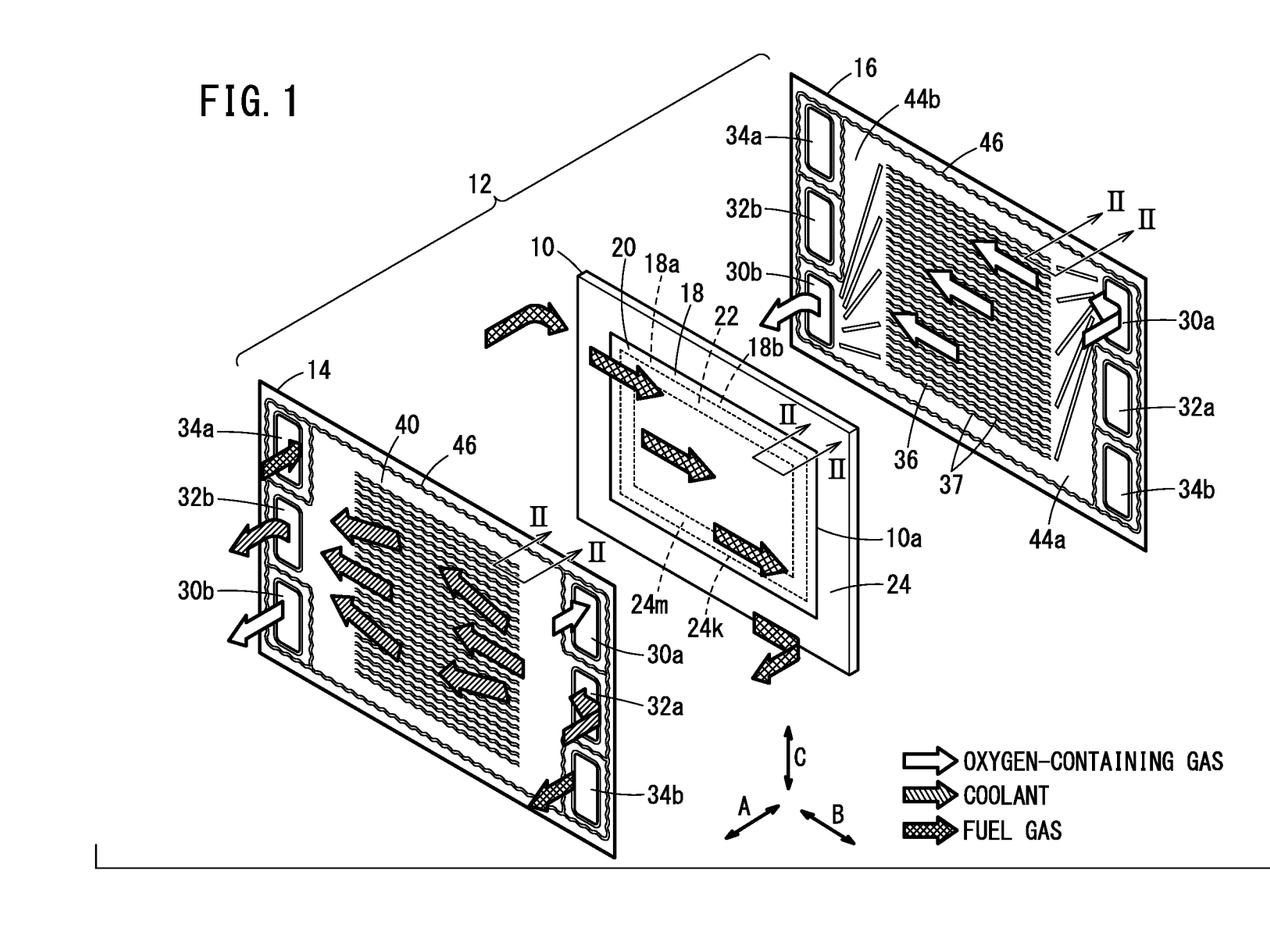
FIG. 1 is an exploded perspective view of a fuel cell (power generation cell) according to the embodiment.

As shown in FIG. 1, a fuel cell 12 (power generation cell) includes a framed membrane electrode assembly 10 (hereinafter referred to as "framed MEA 10"), a first separator 14 and a second separator 16 arranged on both sides of the framed MEA 10. The fuel cell 12 is a solid polymer electrolyte fuel cell. The fuel cell 12 has, for example, a horizontally long (or vertically long) rectangular shape. The fuel cell stack (not shown) includes a plurality of fuel cells 12 stacked one another in the direction of arrow A, for example. The fuel cell stack is, for example, an in-vehicle fuel cell stack. For example, the in-vehicle fuel cell stack is mounted on a fuel cell electric vehicle (not shown) in a state in which the stacking direction of the fuel cells 12 is directed in the horizontal direction or the vertical direction.

In the fuel cell 12, the first separator 14 and the second separator 16 hold the framed MEA 10. The first separator 14 and the second separator 16 respectively have laterally long (or vertically long) rectangular shapes. For example, each of the first separator 14 and the second separator 16 is a steel plate, a stainless steel plate, an aluminum plate, a titanium plate, a plated steel plate, or a metal plate having an anti-corrosive surface by surface treatment, or is formed of a carbon member and the like.

The rectangular framed MEA 10 includes a membrane electrode assembly 10a (hereinafter referred to as "MEA 10a"). The MEA 10a has an electrolyte membrane 18, an anode 20, and a cathode 22. The first electrode is the anode 20 in the present embodiment. The anode 20 covers the first surface 18a of the electrolyte membrane 18 (the front side of the paper in FIG. 1). The second electrode is the cathode 22 in this embodiment. The cathode 22 covers the second surface 18b of the electrolyte membrane 18 (the back side of the paper in FIG. 1).

The electrolyte membrane 18 is, for example, a solid polymer electrolyte membrane (cation exchange membrane). The solid polymer electrolyte membrane is, for example, a thin film of perfluorosulfonic acid containing water and made of a material that allows hydrogen ions to permeate therethrough. The HC (hydrocarbon) electrolyte can be used for the electrolyte membrane 18 instead of the fluorine electrolyte. The electrolyte membrane 18 is sandwiched between the anode 20 and the cathode 22.

Figure 2:
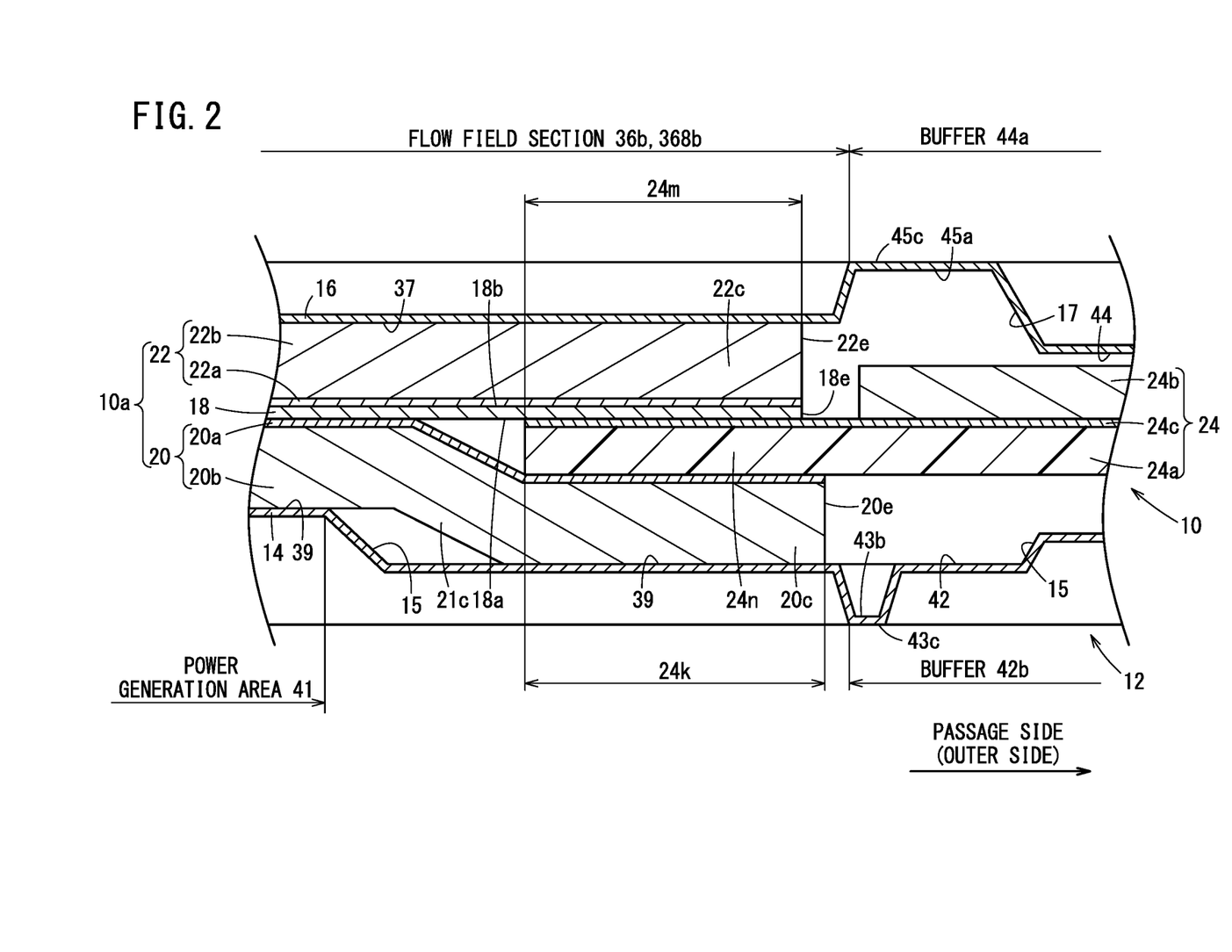
FIG. 2 is a cross-sectional view of a portion corresponding to the line II-II in FIG. 1.

As shown in FIG. 2, the surface of the anode 20 has a larger dimension (outer dimension) than the surfaces of the electrolyte membrane 18 and the cathode 22. The anode 20 has a first catalyst layer 20a and a first gas diffusion layer 20b. The first catalyst layer 20a is joined to the first surface 18a of the electrolyte membrane 18. The first gas diffusion layer 20b is laminated on the first catalyst layer 20a. The first catalyst layer 20a and the first gas diffusion layer 20b have the same surface dimensions as each other. The first catalyst layer 20a and the first gas diffusion layer 20b have surface dimensions slightly larger than those of the electrolyte membrane 18 and the cathode 22.

The cathode 22 has a second catalyst layer 22a and a second gas diffusion layer 22b. The second catalyst layer 22a is joined to the second surface 18b of the electrolyte membrane 18. The second gas diffusion layer 22b is laminated on the second catalyst layer 22a. The second catalyst layer 22a and the second gas diffusion layer 22b have the same surface dimensions as each other, and as the surface dimension of the electrolyte membrane 18. Therefore, the outer end 22e of the cathode 22 is aligned with the outer end 18e of the electrolyte membrane 18 in the surface direction of the electrolyte membrane 18.

The cathode 22 is set to have the surface dimension smaller than that of the anode 20. Thus, the outer end 22e of the cathode 22 and the outer end 18e of the electrolyte membrane 18 are positioned inward of the outer end 20e of the anode 20 over the entire circumference.

The cathode 22 may have a surface dimension larger than that of the anode 20, and the outer end 22e of the cathode 22 may be positioned outward of the outer end 20e of the anode 20 over the entire circumference. Alternatively, the anode 20 and the cathode 22 may have the same surface dimension, and the outer end 20e of the anode 20 and the outer end 22e of the cathode 22 may be aligned at the same position in the surface direction of the electrolyte membrane 18.

The first electrode catalyst layer 20a is formed by depositing porous carbon particles uniformly on the surface of the first gas diffusion layer 20b together with ion conductive polymer binder, and platinum alloy is supported on surfaces of the carbon particles. The second catalyst layer 22a is formed by depositing porous carbon particles uniformly on the surface of the second gas diffusion layer 22b together with ion conductive polymer binder, and platinum alloy is supported on surfaces of the carbon particles.

Each of the first gas diffusion layer 20b and the second gas diffusion layer 22b comprises a carbon paper or a carbon cloth. The surface dimension of the second gas diffusion layer 22b is smaller than that of the first gas diffusion layer 20b. The first catalyst layer 20a and the second catalyst layer 22a are disposed on both surfaces of the electrolyte membrane 18, respectively.

As shown in FIG. 1, the framed MEA 10 further includes a rectangular frame member 24. The frame member 24 surrounds the electrolyte membrane 18 over the entire circumference, and is joined to the anode 20 and the cathode 22. As shown in FIG. 2, the frame member 24 has two frame-shaped sheets of a first resin frame 24a and a second resin frame 24b. The first resin frame 24a and the second resin frame 24b are laminated in the thickness direction to form the frame member 24. The first resin frame 24a and the second resin frame 24b are joined through an adhesive layer 24c. The second resin frame 24b (frame-shaped sheet) is laminated on and joined to the outer peripheral portion on the cathode-side surface of the first resin frame 24a (frame-shaped sheet). Thus, the frame member 24 has the outer peripheral portion thicker than the inner peripheral portion 24n.

The frame-shaped sheet forming the frame member 24 is made of resin. Examples of materials of the resin frame member 24 include PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin.

As shown in FIG. 2, the inner peripheral portion 24n of the frame member 24 is arranged between the outer peripheral portion 20c of the anode 20 and the outer peripheral portion 22c of the cathode 22. Specifically, the inner peripheral portion 24n of the frame member 24 is interposed between the outer peripheral portion of the electrolyte membrane 18 and the outer peripheral portion 20c of the anode 20. The frame member 24 and the outer peripheral portion of the electrolyte membrane 18 are joined to each other through an adhesive (adhesive layer 24c).

The inner peripheral portion 24n of the frame member 24 has an overlapping portion 24k that overlaps the outer peripheral portion 20c of the anode 20 over the entire circumference when viewed from the thickness direction of the MEA 10a. The anode 20 has an inclined step portion 21c at a point where the anode 20 rides on the frame member 24.

In addition, the inner peripheral portion 24n of the frame member 24 has an overlapping portion 24m that overlaps the outer peripheral portion 22c of the cathode 22 over the entire circumference as viewed in the thickness direction of the MEA 10a. The cathode 22 and the electrolyte membrane 18 are flat even at the overlapping portion 24m.

In a case where the frame member 24 is formed of two frame-shaped sheets to be thick on the outer peripheral side, it is preferable that the inner peripheral end of the second resin frame 24b that is the inner peripheral end of the thickened portion of the frame member 24 is spaced apart from the outer peripheral end 18e of the electrolyte membrane 18 outwards.

The overlapping portion 24k in which the outer peripheral portion of the anode 20 and the inner peripheral portion of the frame member 24 overlap, and the overlapping portion 24m in which the outer peripheral portion of the cathode 22 and the inner peripheral portion 24n of the frame member 24 overlap are sandwiched by the ridges 39 of the first separator 14 protruding toward the anode 20 and the ridges 37 of the second separator 16 protruding toward the cathode 22.

As shown in FIG. 1, the fuel cell 12 has an oxygen-containing gas supply passage 30a, a coolant supply passage 32a, and a fuel gas discharge passage 34b at one end portion in the direction of arrow B (horizontal direction). The oxygen-containing gas supply passage 30a, the coolant supply passage 32a, and the fuel gas discharge passage 34b independently extend in the direction of arrow A which is the stacking direction. An oxygen-containing gas is supplied through the oxygen-containing gas supply passage 30a. A coolant is supplied through the coolant supply passage 32a. A fuel gas, for example, a hydrogen-containing gas is discharged through the fuel gas discharge passage 34b. The oxygen-containing gas supply passage 30a, the coolant supply passage 32a, and the fuel gas discharge passage 34b are arranged along the direction of arrow C.

The fuel cell 12 has a fuel gas supply passage 34a, a coolant discharge passage 32b, and an oxygen-containing gas discharge passage 30b at the other end portion in the direction of arrow B. The fuel gas supply passage 34a, the coolant discharge passage 32b, and the oxygen-containing gas discharge passage 30b independently extend in the direction of arrow A. The fuel gas is supplied through the fuel gas supply passage 34a. The coolant is discharged through the coolant discharge passage 32b. The oxygen-containing gas is discharged through the oxygen-containing gas discharge passage 30b. The fuel gas supply passage 34a, the coolant discharge passage 32b, and the oxygen-containing gas discharge passage 30b are arranged in the direction of arrow C.

Figure 3:
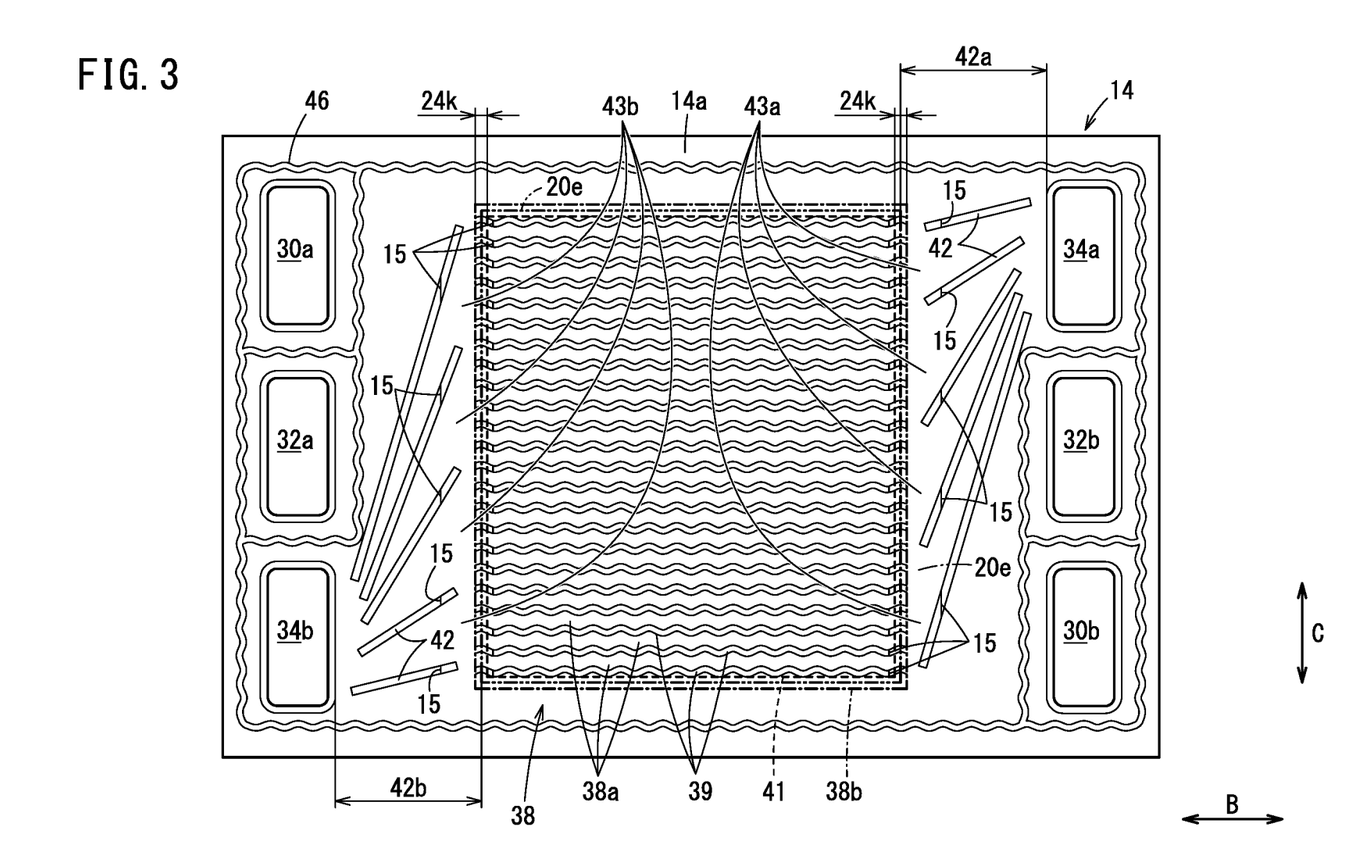
FIG. 3 is a plan view of a surface of the first separator shown in FIG. 1 facing a membrane electrode assembly.

As shown in FIG. 3, the first separator 14 has a fuel gas flow field 38 communicating with the fuel gas supply passage 34a and the fuel gas discharge passage 34b, on a surface 14a facing the framed MEA 10. The fuel gas flow field 38 is formed between the first separator 14 and the framed MEA 10. The fuel gas flow field 38 has a plurality of wavy flow field grooves 38a extending in the direction of arrow B.

Figure 4:
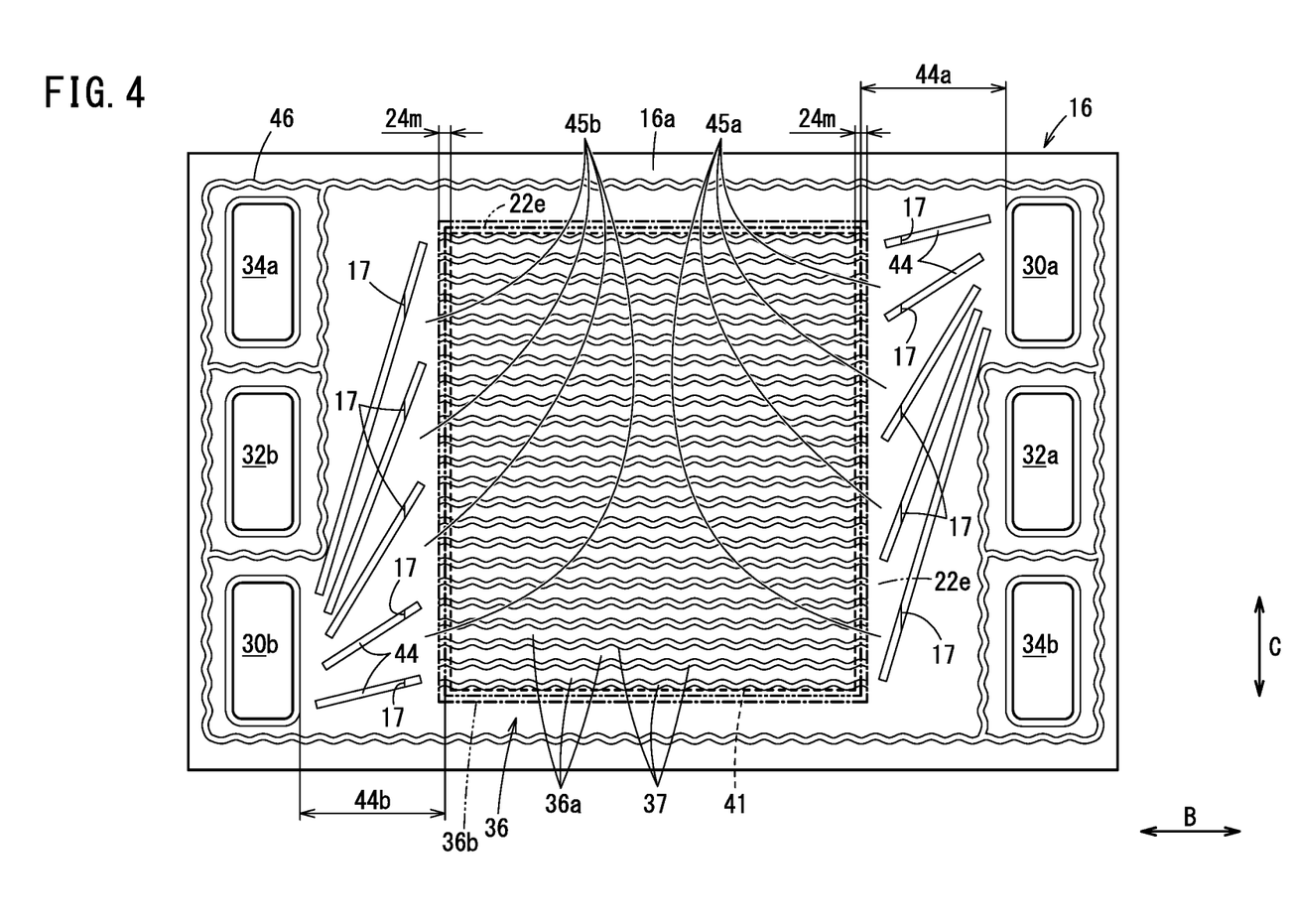
FIG. 4 is a plan view of a surface of the second separator shown in FIG. 1 facing the membrane electrode assembly.

As shown in FIG. 4, the second separator 16 has an oxygen-containing gas flow field 36 communicating with the oxygen-containing gas supply passage 30a and the oxygen-containing gas discharge passage 30b, on a surface 16a facing the framed MEA 10. Specifically, the oxygen-containing gas flow field 36 is formed between the second separator 16 and the framed MEA 10. The oxygen-containing gas flow field 36 has a plurality of wavy flow field grooves 36a extending in the direction of arrow B.

Between the surface 14b of the first separator 14 and the surface 16b of the second separator 16 adjacent to each other in a state where the fuel cells are stacked together, a coolant flow field 40 communicating with the coolant supply passage 32a and the coolant discharge passage 32b and extending in the direction of the arrow B is formed.

As shown in FIG. 3, the surface 14a (surface facing the framed MEA 10) of the first separator 14 has a plurality of ridges 39 forming the fuel gas flow field 38. The ridges 39 protrude toward the anode 20 and contact the anode 20. Each of the ridges 39 is formed in a wavy line shape and extends in the direction of arrow B. Wavy flow field grooves 38a are formed between the plurality of ridges 39. The ridges 39 and the wavy flow field grooves 38a are alternately arranged in the flow field width direction (arrow C direction). The section in which the ridges 39 and the wavy flow field grooves 38a are formed is called a flow field section 38b (anode side). The flow field section 38b is formed in a surface dimension larger than that of the power generation area 41 in which power generation is performed in the framed MEA 10. The power generation area 41 corresponds to the section in which the first catalyst layer 20a and the second catalyst layer 22a face each other through the electrolyte membrane 18.

On the surface 14a of the first separator 14, an inlet buffer 42a having a plurality of linear protrusions 42 extending radially from the fuel gas supply passage 34a is provided between the fuel gas supply passage 34a and the flow field section 38b. In the inlet buffer 42a, ends of the linear protrusions 42 extends to the vicinity of the ridges 39. Because the number of the linear protrusions 42 is smaller than the number of the ridges 39, ends of some ridges 39 on the fuel gas supply passage 34a side are isolated at the boundary between the flow field section 38b and the inlet buffer 42a. Branching portions 43a of the flow path are positioned closer to the fuel gas supply passage 34a than the ends of the ridges 39 are. The branching portions 43a are relatively large voids without any structure supporting the framed MEA 10 such as the ridges 39 and the linear protrusions 42.

On the surface 14a of the first separator 14, an outlet buffer 42b having a plurality of linear protrusions 42 extending radially from the fuel gas discharge passage 34b is provided between the fuel gas discharge passage 34b and the flow field section 38b. Also in the outlet buffer 42b, the linear protrusions 42 extend to the vicinity of some of the ridges 39. Because the number of the linear protrusions 42 of the outlet buffer 42b is smaller than the number of the ridges 39, ends of some ridges 39 are isolated at the boundary between the flow field section 38b and the outlet buffer 42b. Merging portions 43b of the flow path in which the ridges 39 and the linear protrusions 42 are not provided are positioned closer to the fuel gas discharge passage 34b than the ends of the ridges 39 are. The merging portions 43b of the flow path are relatively large voids without any structure supporting the framed MEA 10.

As shown in FIG. 2, the merging portions 43b formed in the outlet buffer 42b belongs to the most depressed layer in the first separator 14. Therefore, the flat surface 43c formed on the back surface of the bottom of the merging portion 43b serves as a joining surface in surface contact with the flat surface 45c formed on the second separator 16 of the other adjacent fuel cell 12. Similarly, in the inlet buffer 42a, the flat surface 43c formed on the back surface of the bottom of the branching portion 43a serves as a joining surface to be joined to the flat surface 45c formed on the second separator 16 of the other adjacent fuel cell 12.

As shown in FIG. 4, a plurality of ridges 37 are formed on the surface 16a of the second separator 16 facing the resin framed MEA 10. The ridges 37 form the oxygen-containing gas flow field 36. The ridges 37 protrude toward the cathode 22 and contacts the cathode 22. Each of the ridges 37 is formed in a wavy line shape and extends in the direction of arrow B in the plan view. Wavy flow field grooves 36a are formed between the plurality of ridges 37. The ridges 37 and the wavy flow field grooves 36a are alternately arranged in the flow field width direction (arrow C direction). The section in which the ridges 37 and the wavy flow field grooves 36a are formed is called a flow field section 36b (cathode side). The flow field section 36b is arranged so as to cover the power generation area 41. When viewed from the thickness direction, the flow field section 38b on the anode side and the flow field section 36b on the cathode side have the same surface dimensions and overlap each other at the same positions.

On the surface 16a of the second separator 16, the inlet buffer 44a having the plurality of linear protrusions 44 extending radially from the oxygen-containing gas supply passage 30a is provided between the oxygen-containing gas supply passage 30a and the flow field section 36b. In the inlet buffer 44a, ends of the linear protrusions 44 extend to the vicinity of the ridges 37. Because the number of the linear protrusions 44 is smaller than the number of the ridges 37, ends of some ridges 37 on the oxygen-containing gas supply passage 30a side are isolated at the boundary between the flow field section 36b and the inlet buffer 44a. Branching portions 45a of the flow path in which the ridges 37 and the linear protrusions 44 are not provided are positioned closer to the oxygen-containing gas supply passage 30a than the ends of the ridges 37 are. The branching portions 45a of the flow path are relatively large voids without any structure supporting the framed MEA 10.

On the surface 16a of the second separator 16, the outlet buffer 44b having the plurality of linear protrusions 44 extending radially from the oxygen-containing gas discharge passage 30b is provided between the oxygen-containing gas discharge passage 30b and the flow field section 36b. Also in the outlet buffer 44b, the linear protrusions 44 extend to the vicinity of some of the ridges 37. Because the number of the linear protrusions 44 of the outlet buffer 44b is smaller than the number of the ridges 37, ends of some ridges 37 are isolated at the boundary between the flow field section 36b and the outlet buffer 44b. Merging portions 45b of the flow path in which the ridges 37 and the linear protrusions 44 are not provided are positioned closer to the oxygen-containing gas discharge passage 30b than the ends of the ridges 37 are. The merging portions 45b of the flow path are relatively large voids without any structure supporting the framed MEA 10.

As shown in FIG. 2, the branching portions 45a formed in the inlet buffer 44a belong to the layer most separated from the framed MEA 10 in the second separator 16. Therefore, the flat surface 45c formed on the back surface of the bottom of the branching portion 45a serves as a joining surface to be joined to the flat surface 43c formed on the first separator 14 of the other adjacent fuel cell 12. The same applies to the merging portions 45b formed in the outlet buffer 44b.

When viewed from the thickness direction, the inlet buffer 42a of the first separator 14 and the outlet buffer 44b of the second separator 16 overlap at the same position. The outlet buffer 42b of the first separator 14 and the inlet buffer 44a of the second separator 16 overlap at the same position. As shown in FIGS. 3 and 4, the voids forming the merging portions 43b and 45b and the voids forming the branching portions 43a and 45a face each other across the framed MEA 10 in the thickness direction.

As shown in FIGS. 2 and 3, the overlapping portion 24k where the anode 20 and the frame member 24 overlap each other is positioned within the flow field section 38b, and does not extend toward the buffers 42a and 42b beyond the boundaries between the flow field section 38b and the buffers 42a and 42b.

As shown in FIGS. 2 and 4, the outer end 22e of the cathode 22 is arranged in the flow field section 36b. That is, the overlapping portion 24m in which the cathode 22 and the frame member 24 overlap each other is positioned within the flow field section 36b without extending beyond the boundaries between the flow field section 36b and the buffers 44a and 44b. The overlapping portion 24m is arranged within the flow field section 36b so as not to extend to the buffers 44a and 44b.

As shown in FIG. 2, the first separator 14 has steps 15 at the end portions of the ridges 39. The steps 15 accommodate the overlapping portion 24k of the anode 20 and the frame member 24. The projection height of the ridges 39 is set to be smaller from the steps 15 to the ends of the ridges 39. In the first separator 14, the linear protrusions 42 provided in the buffers 42a and 42b also have steps 15. The projection height of the linear protrusions 42 is set to be smaller on the power generation area 41 side of the steps 15 (inner side) to provide a clearance for accommodating the overlapping portion 24k of the frame member 24 and the anode 20.

The linear protrusions 44 of the second separator 16 have steps 17 for accommodating the second resin frame 24b. Although not shown in the cross-section of FIG. 2, the linear protrusions 44 continue on the back side of the paper surface of the drawing. The projection height of the linear protrusions 44 is set to be smaller on the power generation area 41 side of the steps 17 (left side of FIG. 2) to provide a clearance for accommodating the second resin frame 24b of the frame member 24.

As shown in FIG. 3, the surface 14a of the first separator 14 is provided with a bead seal 46 that surrounds the outer peripheral portion of the first separator 14 in order to prevent leakage of the fuel gas to the outside. Further, the oxygen-containing gas supply passage 30a, the oxygen-containing gas discharge passage 30b, the coolant supply passage 32a and the coolant discharge passage 32b are surrounded respectively by bead seals 46. These bead seals 46 are formed integrally with the first separator 14 by press-forming so as to protrude toward the frame member 24. Elastic members such as rubber may be fixed to the top portions of the bead seals 46. Instead of the bead seals 46, seals made of an elastic body may be provided so as to protrude toward the frame member 24.

As shown in FIG. 4, the surface 16a of the second separator 16 is provided with a bead seal 46 that surrounds the outer peripheral portion of the second separator 16 in order to prevent leakage of the oxygen-containing gas to the outside. The coolant supply passage 32a, the coolant discharge passage 32b, the fuel gas supply passage 34a, and the fuel gas discharge passage 34b are surrounded respectively by bead seals 46. These bead seals 46 are formed integrally with the second separator 16 by press-forming so as to protrude toward the frame member 24. The bead seals 46 may be provided, for example, doubly or triply or more.

The bead seals 46 of the first separator 14 and the bead seals 46 of the second separator 16 face each other through the frame member 24. The outer peripheral portion of the frame member 24 is sandwiched between the bead seal 46 of the first separator 14 and the bead seal 46 of the second separator 16.

The operation of the fuel cell stack including the fuel cell 12 configured as described above will be described below.

As shown in FIG. 1, the oxygen-containing gas (for example, air) is supplied to the oxygen-containing gas supply passage 30a. The fuel gas such as a hydrogen-containing gas (for example, a mixed gas of hydrogen and water vapor) is supplied to the fuel gas supply passage 34a. A coolant such as pure water, ethylene glycol, or oil is supplied to the coolant supply passage 32a.

The oxygen-containing gas flows onto the surface 16a of the second separator 16 from the oxygen-containing gas supply passage 30a. The oxygen-containing gas is distributed by the inlet buffer 44a and flows into the oxygen-containing gas flow field 36 (flow field section 36b).

Figure 5:
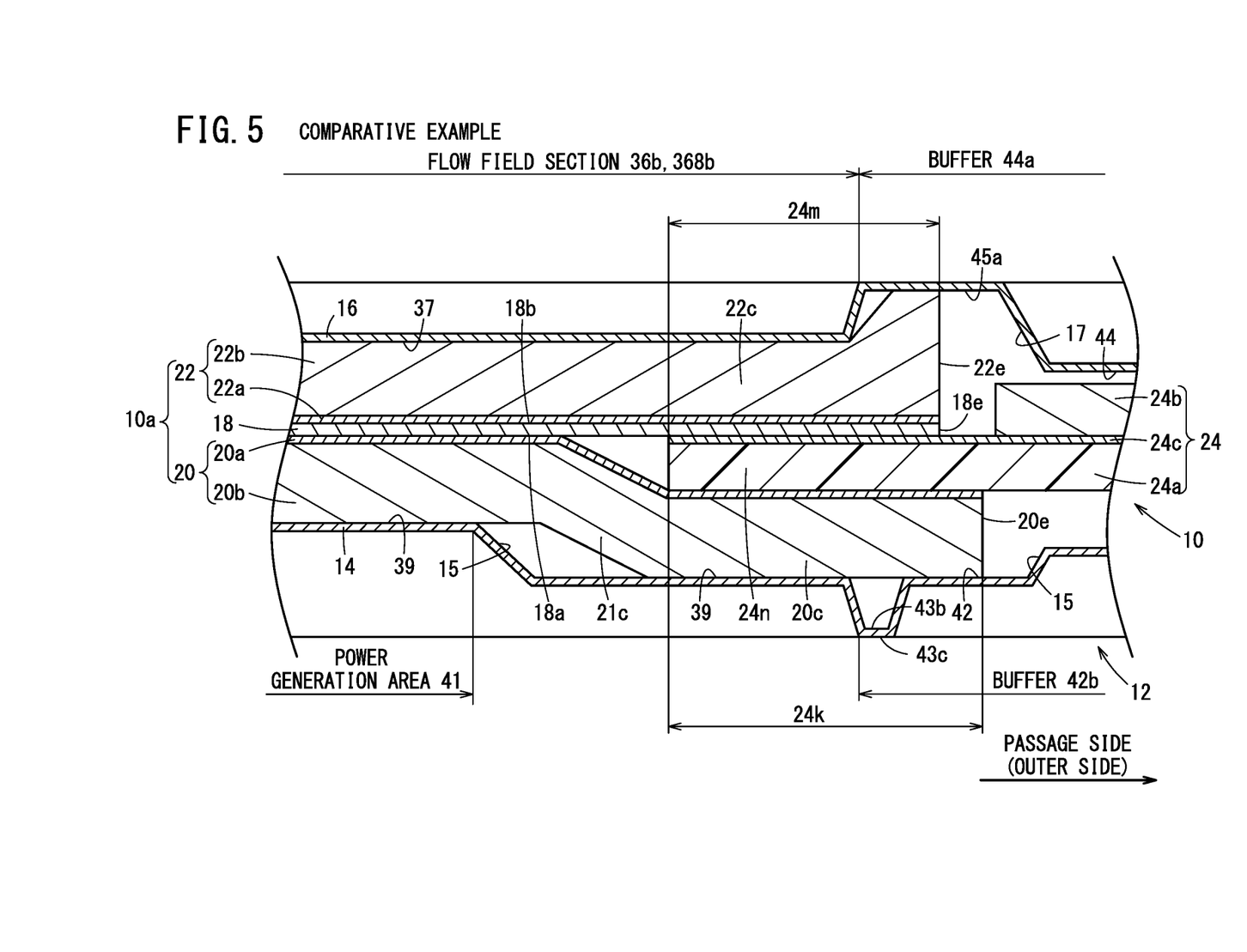
FIG. 5 is a cross-sectional view corresponding to FIG. 2 and showing a portion of a fuel cell according to a comparative example.

In the fuel cell 12 shown in the comparative example of FIG. 5, the overlapping portion 24m of the frame member 24 and the cathode 22 and the overlapping portion 24k of the frame member 24 and the anode 20 extend closer to the buffers 42b and 44a beyond the boundaries between the flow field sections 36b and 38b and the buffers 42b and 44a. Therefore, the anode 20 and the cathode 22 compressed by the ridges 37 and 39 of the flow field sections 36b and 38b bulge toward the merging portions 43b and the branching portions 45a, thereby filling part of the flow paths. Therefore, the cross-sectional area of the flow paths of the reactant gas decreases and the flow resistance of the gas increases.

On the other hand, in this embodiment, as shown in FIG. 2, the overlapping portion 24m between the inner peripheral portion 24n of the frame member 24 and the outer peripheral portion 22c of the cathode 22 is arranged so as to be positioned within the flow field section 36b without extending beyond the boundary between the inlet buffer 44a and the flow field section 36b. Therefore, the fuel cell 12 can prevent the overlapping portion 24m from bulging into the inlet buffer 44a and filling the inlet buffer 44a, thereby preventing the pressure loss of the oxygen-containing gas from increasing.

The oxygen-containing gas that has passed through the inlet buffer 44a flows into the wavy flow field grooves 36a of the oxygen-containing gas flow field 36, flows along the electrode surface in the direction of the arrow B along the wavy flow field grooves 36a, thereby being supplied to the cathode 22. The oxygen-containing gas is consumed at the cathode 22. The remaining oxygen-containing gas left over after consumption is discharged from the outlet buffer 44b and flows in the direction of arrow A through the oxygen-containing gas discharge passage 30b.

Also at the boundary between the flow field section 36b and the outlet buffer 44b, the overlapping portion 24m of the inner peripheral portion 24n of the frame member 24 and the outer peripheral portion 22c of the cathode 22 is arranged only within the flow field section 36b. Therefore, the fuel cell 12 can prevent the overlapping portion 24m from bulging into the outlet buffer 44b and filling the outlet buffer 44b, and can prevent increase in pressure loss of the oxygen-containing gas. The burden on the air pump (not shown) that supplies the oxygen-containing gas is reduced in this manner.

On the other hand, the fuel gas flows into the inlet buffer 42a of the first separator 14 through the fuel gas supply passage 34a. The fuel gas is distributed by the inlet buffer 42a and flows into the fuel gas flow field 38 of the first separator 14. In this embodiment, the overlapping portion 24k of the frame member 24 and the anode 20 is positioned within the flow field section 38b and does not extend beyond the boundary between the inlet buffer 42a or the outlet buffer 42b and the flow field section 38b. Therefore, this structure prevents the anode 20 in the overlapping portions 24k from filling the branching portions 43a and the merging portions 43b. Therefore, according to the fuel cell 12 of the present embodiment, a sufficient amount of fuel gas can be supplied to the power generation area 41.

After being distributed by the inlet buffer 42a, the fuel gas flows along the electrode surface in the direction of arrow B along the wavy flow field grooves 38a of the fuel gas flow field 38. The fuel gas is supplied to the anode 20 of the MEA 10a. The fuel gas is consumed at the anode 20 and the remaining fuel gas left over after consumption is discharged from the outlet buffer 42b and flows in the direction of arrow A through the fuel gas discharge passage 34b.

In the power generation area 41 on the inner side of the frame member 24 of the MEA 10a, the oxygen-containing gas supplied to the cathode 22 and the fuel gas supplied to the anode 20 are consumed by electrochemical reactions inside the second catalyst layer 22a and the first catalyst layer 20a, and power generation is performed.

Further, the coolant supplied to the coolant supply passage 32a is introduced into the coolant flow field 40 between the first separator 14 and the second separator 16, and then flows in the direction of arrow B. After cooling the MEA 10a, the coolant is discharged from the coolant discharge passage 32b.

A modified example of the present embodiment will be described below.

Modified Example 1

Figure 6:
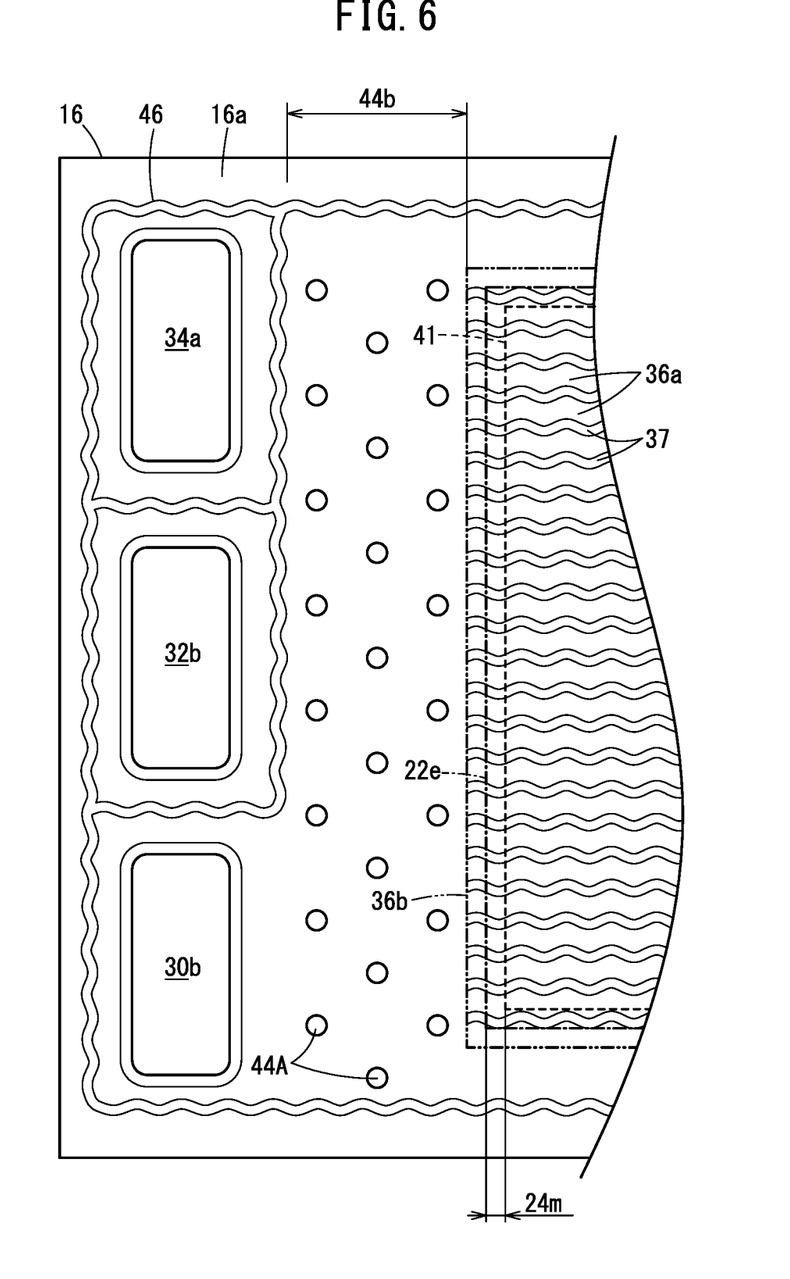
FIG. 6 is a partial enlarged view of the first separator according to Modified example 1 of the embodiment.

Modified example 1 of the present embodiment differs in the buffers 42a, 42b, 44a and 44b of the separators 14 and 16. That is, as shown in FIG. 6, in the present modification, the buffer 44b (outlet side) of the second separator 16 includes a plurality of bosses 44A arranged at constant intervals in the flow field direction (arrow B direction) and the flow field width direction (arrow C direction). The second separator 16 is formed to have the bosses 44A protruding toward the framed MEA 10 and isolated from each other in the plan view. The top portions of the bosses 44A are in contact with the framed MEA 10. The other buffers 42a, 42b, and 44a are also formed by arranging a plurality of bosses 44a in the same manner as the buffer 44b shown in FIG. 6.

Also in the present modification, the ends of the ridges 37 of the flow field section 36b are positioned at the boundary between the buffer 44a or 44b and the flow field section 36b, and thus relatively large voids at which the ridges 37 supporting the framed MEA 10 are not provided are formed on the buffers 44a and 44b sides of the ridges 37 so as to form branching or merging portions of the flow path. The overlapping portion 24m between the outer peripheral portion 22c of the cathode 22 and the frame member 24 is arranged so as to be positioned within the flow field section 36b in order to prevent the branching or merging portions of the flow path from being blocked. As a result, the same effects as those of the fuel cell 12 described with reference to FIGS. 1 to 4 can be obtained by the present modification.

Modified Example 2

Figure 7:
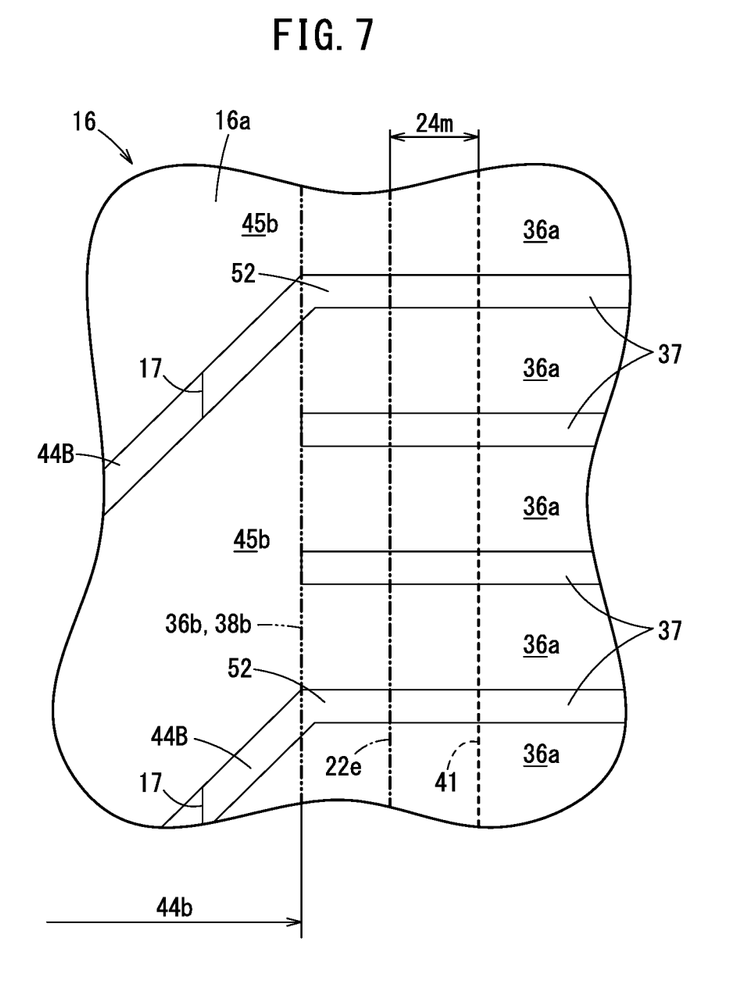
FIG. 7 is a partial enlarged view of the vicinity of the boundary between the flow field section and the buffer of the second separator of the fuel cell according to Modified example 2 of the embodiment.

The modified example 2 of the present embodiment differs in the buffers 42a, 42b, 44a and 44b of the separators 14 and 16. That is, as shown in FIG. 7, in the present modification, the buffer 44*b* (outlet side) of the second separator 16 is formed by linear ridges 44B extending radially. Some of the linear ridges 44B have ends connected to some of the ridges 37 of the flow field section 36*b* via the bent portions 52. The bent portions 52 are aligned along the boundary of the flow field section 36*b*. Although not shown in particular, other buffers 42*a*, 42*b*, and 44*a* of the present modification are also constructed in the same manner as in FIG. 6.

In the present modification, since the number of ridges 37 of the flow field section 36*b* is larger than the number of linear protrusions 44*b*, some of the ridges 37 terminate at the boundaries between the flow field section 36*b* and the buffers 44*a* and 44*b*. Therefore, branching portions 43*a* and 45*a* or merging portions 43*b* and 45*b* of the flow path are formed on the side of the buffers 44*a* and 44*b* of the terminated and isolated ridges 37. The branching portions 43*a*, 45*a* and the merging portions 43*b*, 45*b* form relatively large voids in which the ridges 37 supporting the framed MEA 10 are not provided. Therefore, also in the present modification, the overlapping portion 24*m* of the outer peripheral portion 22*c* of the cathode 22 and the frame member 24 is arranged within the flow field section 36*b* in order to prevent blockage of the branching portions 43*a*, 45*a* or the merging portions 43*b*, 45*b* of the flow path. As a result, the same effects as those of the fuel cell 12 described with reference to FIGS. 1 to 4 can be obtained by the present modification.

The fuel cell 12 of the present embodiment has the following effects.

The fuel cell 12 includes: the membrane electrode assembly 10 having the pair of electrodes (anode 20, cathode 22) provided on both sides of the electrolyte membrane 18 and the frame member 24 joined to the outer peripheral portion of the electrolyte membrane 18; the pair of separators (first separator 14, second separator 16) for sandwiching the membrane electrode assembly 10; the flow field section 36*b*, 38*b* including the plurality of ridges 37, 39 each projecting, in the shape of the line, from one of the separators 14, 16 toward a power generation area 41 of the membrane electrode assembly 10, and the plurality of flow field grooves 36*a*, 38*a* formed between the ridges 37, 39 to allow the reactant gas to flow along the electrode surface of one of the electrodes of the membrane electrode assembly 10; the passage penetrating the separators 14, 16 in the thickness direction for supplying or discharging the reactant gas; and a buffer 44*a*, 44*b* provided between the passage (oxygen-containing gas supply passage 30*a*, oxygen-containing gas discharge passage 30*b*) and the flow field section 38*b* for guiding the reactant gas between the passage and the flow field section, wherein an outer end 22*e* of at least one of the electrodes (cathode 22) is arranged in the flow field section 36*b*, and the outer peripheral portion 22*c* of the at least one of the electrodes (cathode 22) overlaps the inner peripheral portion 24*n* of the frame member 24 at the overlapping portion 24*m* positioned within the flow field section 36*b*, without extending beyond the boundary between the buffer 44*a*, 44*b* and the flow field section 36*b*.

According to the configuration described above, it is possible to prevent the overlapping portions 24*m* from bulging into the buffers 44*a* and 44*b* and filling the buffers 44*a* and 44*b*, thereby preventing increase in pressure loss of the oxygen-containing gas. That is, as shown in the comparative example of FIG. 5, in a case where the overlapping portions 24*m* extends toward and into the buffers 44*a* and 42*a*, the overlapping portion 24*m* expands in the thickness direction in the voids forming the branching portions 43*a* and 45*a* (or the merging portions 43*b* and 45*b*) of the flow path adjacent to the linear protrusions 44 on the back side or the front side of the paper, thereby narrowing the branching portions 43*a* and 45*a* (or the merging portions 43*b* and 45*b*) of the flow path. As a result, it becomes difficult for the oxygen-containing gas to flow through the branching portions 43*a* and 45*a* (or the merging portions 43*b* and 45*b*) of the flow path in the buffers 44*a*, 44*b*, so that the gas flow resistance increases and the pressure loss increases.

In contrast, as shown in FIGS. 2 to 4, in the present embodiment, the overlapping portion 24*m* does not stick out from the flow field section 36*b*, thereby preventing the overlapping portion 24*m* from extending into the merging portions 43*b* and 45*b* and the branching portions 43*a* and 45*a* of the flow paths in the buffers 44*a* and 44*b*. As a result, it is possible to prevent the overlapping portion 24*m* from narrowing the buffers 44*a* and 44*b*.

In the fuel cell 12 described above, the electrode has the first electrode (for example, the anode 20) provided on the first surface 18*a* of the electrolyte membrane 18 and the second electrode (for example, the cathode 22) provided on the second surface 18*b* of the electrolyte membrane 18, the inner peripheral portion 24*n* of the frame member 24 may be interposed between the outer peripheral portion of the first surface 18*a* of the electrolyte membrane 18 and the outer peripheral portion of the first electrode, and the overlapping portion 24*m* between the outer peripheral portion of the second electrode and the inner peripheral portion 24*n* of the frame member 24 may be arranged within the flow field sections 36*b*, 38*b* so as not to extend beyond the boundary between the buffer 44*a*, 44*b* and the flow field sections 36*b*, 38*b*. According to this configuration, the pressure loss in the buffer 44*a* and 44*b* can be prevented with respect to the reactant gas supplied to the second electrode side.

In the fuel cell 12 described above, the outer end 20*e* of the first electrode (anode 20) and the outer end 22*e* of the second electrode (cathode 22) may be provided at different positions.

In the fuel cell 12 described above, the overlapping portion 24*k* between the outer peripheral portion of the first electrode and the inner peripheral portion 24*n* of the frame member 24 may extend in the buffers 42*a* and 42*b*. According to this configuration, it is possible to reduce layout restrictions on the first electrode. For example, the degree of freedom in design is improved in relation to the anode 20, to which a hydrogen gas supplied from a high-pressure tank, which is relatively insusceptible to pressure loss, is supplied.

In the fuel cell 12 described above, the pressure of the first reactant gas supplied to the first electrode may be higher than the pressure of the second reactant gas supplied to the second electrode. According to this configuration, the pressure loss in the buffers 44*a* and 44*b* can be reduced with respect to the second reactant gas which is supplied at a low pressure and susceptible to the pressure loss.

In the fuel cell 12 described above, the frame member 24 may be joined to the electrolyte membrane 18 by an adhesive.

In the fuel cell 12 described above, the overlapping portion 24*k* between the outer peripheral portion 20*c* of the first electrode (for example, the anode 20) and the inner peripheral portion 24*n* of the frame member 24 may be positioned within the flow field section 38*b* without extending beyond the boundary between the buffer 42*a*, 42*b* and the flow field section 38*b*. According to this configuration, the pressure loss in the buffer 42*a*, 42*b* can be reduced on the first electrode side as well.

Although preferred embodiments of the present invention have been described above, the present invention is not limited to the above-described embodiments, and various modifications can be made without departing from the gist of the present invention.

What is claimed is:

1. A fuel cell comprising:

a membrane electrode assembly having a pair of electrodes provided on both sides of an electrolyte membrane and a frame member joined to an outer peripheral portion of the electrolyte membrane;

a pair of separators for sandwiching the membrane electrode assembly, a flow field section including a plurality of ridges each projecting, in a shape of a line, from one of the separators toward a power generation area of the membrane electrode assembly, and a plurality of flow field grooves formed between the ridges to allow a reactant gas to flow along an electrode surface of one of the electrodes of the membrane electrode assembly;

a passage penetrating the separators in a thickness direction for supplying or discharging the reactant gas; and a buffer provided between the passage and the flow field section for guiding the reactant gas between the passage and the flow field section, wherein at least one of the electrodes has an outer end that faces the passage and the at least one of the electrodes is so arranged that the outer end is positioned within the flow field section, and an outer peripheral portion of the at least one of the electrodes including the outer end that faces the passage overlaps an inner peripheral portion of the frame member at an overlapping portion positioned within the flow field section, without extending beyond a boundary between the buffer and the flow field section.

2. The fuel cell according to claim 1, wherein the pair of electrodes comprise a first electrode and a second electrode, the electrolyte membrane comprises a first surface and a second surface, and the first electrode is provided on the first surface and the second electrode is provided on the second surface, the inner peripheral portion of the frame member is interposed between an outer peripheral portion of the electrolyte membrane and an outer peripheral portion of the first electrode, and the outer peripheral portion of the second electrode overlaps the inner peripheral portion of the frame member at the overlapping portion positioned within the flow field section, without extending beyond the boundary between the buffer and the flow field section.

3. The fuel cell according to claim 2, wherein an outer end of the first electrode and the outer end of the second electrode are arranged at different positions in plan view.

4. The fuel cell according to claim 3, wherein the outer peripheral portion of the first electrode overlaps the inner peripheral portion of the frame member at an overlapping portion extending beyond the boundary between the buffer and the flow field section.

5. The fuel cell according to claim 4, wherein a pressure of a first reactant gas supplied to the first electrode is higher than a pressure of a second reactant gas supplied to the second electrode.

6. The fuel cell according to claim 2, wherein the outer peripheral portion of the first electrode overlaps the inner peripheral portion of the frame member at the overlapping portion positioned within the flow field section, without extending beyond the boundary between the buffer and the flow field section.

7. The fuel cell according to claim 1, wherein the frame member is joined to the electrolyte membrane with an adhesive.

\* \* \* \* \*